United States Patent
Diebold et al.

(10) Patent No.: US 12,451,601 B2
(45) Date of Patent: Oct. 21, 2025

(54) CIRCUIT AND SYSTEM APPARATUS FOR SYNTHESIZING ONE OR MULTIPLE BEAMS ON A SWITCHED-FEED ANTENNA

(71) Applicant: All.Space Networks Limited, Reading (GB)

(72) Inventors: Sebastian Diebold, Reading (GB); Vikas Sharma, Reading (GB); Brian Murphy Billman, Baltimore, MD (US); Jeremiah P. Turpin, Linthicum, MD (US)

(73) Assignee: All.Space Networks Limited, Reading (GB)

( * ) Notice: Subject to any disclaimer, the term of this patent is extended or adjusted under 35 U.S.C. 154(b) by 0 days.

(21) Appl. No.: 18/516,684

(22) Filed: Nov. 21, 2023

(65) Prior Publication Data

US 2024/0088554 A1     Mar. 14, 2024

Related U.S. Application Data

(63) Continuation of application No. 17/084,396, filed on Oct. 29, 2020, now Pat. No. 11,870,154.

(Continued)

(51) Int. Cl.
*H01Q 3/26* (2006.01)
*H01Q 3/36* (2006.01)
(Continued)

(52) U.S. Cl.
CPC .......... *H01Q 3/2617* (2013.01); *H01Q 3/36* (2013.01); *H04B 1/1607* (2013.01); *H04B 7/043* (2013.01)

(58) Field of Classification Search
CPC .......... H01Q 3/2617; H01Q 3/30; H01Q 3/34; H01Q 3/36; H01Q 3/38; H01Q 3/40;
(Continued)

(56) References Cited

U.S. PATENT DOCUMENTS 6,198,438 B1 *   3/2001   Herd ................. H01Q 3/247
                                              343/700 MS
10,116,051 B2   10/2018   Scarborough et al.
(Continued)

FOREIGN PATENT DOCUMENTS

WO     2010/110653 A1     9/2010

OTHER PUBLICATIONS

International Search Report and Written Opinion mailed Feb. 3, 2021 in connection with International Application No. PCT/IB2020/060178.

(Continued)

*Primary Examiner* — Seokjin Kim
(74) *Attorney, Agent, or Firm* — Wolf, Greenfield & Sacks, P.C.

(57) ABSTRACT

A circuit has at least one amplifier and a signal routing device such as one or more switches, and an array of antenna elements from which some subset must be enabled and processed at a time. The antenna elements can be grouped in accordance with an organization scheme (e.g., rows, columns) to enable more flexibility in selecting and routing the signals. The system is used to create one or more beams, which can be pointed (steered) to a wide range of directions by means of selecting one or more feed antennas in a switched-feed antenna without including full receive and transmit circuitry (DSP, frequency conversion) for each feed in the array. In this case, minimizing the number of DSP chains is desirable to reduce the cost, power, and complexity of the antenna. The resulting beam(s) can be combined and manipulated to support multiple users, track several targets, increase operational range, increase radar resolution, or data-rate in communications.

20 Claims, 15 Drawing Sheets

Related U.S. Application Data

(60) Provisional application No. 62/930,286, filed on Nov. 4, 2019.

(51) Int. Cl.
  *H04B 1/16*      (2006.01)
  *H04B 7/0426*    (2017.01)

(58) Field of Classification Search
  CPC .... H01Q 3/42; H01Q 3/2627; H01Q 21/0006; H01Q 3/24; H01Q 21/065; H01Q 21/24; H01Q 25/00; H04B 1/1607; H04B 7/043
  See application file for complete search history.

(56) References Cited

U.S. PATENT DOCUMENTS

| | | | | |
|---|---|---|---|---|
| 11,870,154 | B2 * | 1/2024 | Diebold | H01Q 21/065 |
| 2008/0143636 | A1 | 6/2008 | Couchman et al. | |
| 2009/0284440 | A1 | 11/2009 | Weidmann et al. | |
| 2009/0289872 | A1 | 11/2009 | Yang | |
| 2011/0102263 | A1 * | 5/2011 | Angeletti | H01Q 3/40 |
| | | | | 342/373 |
| 2018/0269576 | A1 * | 9/2018 | Scarborough | H01Q 21/0025 |
| 2020/0058996 | A1 * | 2/2020 | Reddy | H01Q 3/40 |
| 2021/0021052 | A1 | 1/2021 | Yu et al. | |
| 2021/0135355 | A1 | 5/2021 | Diebold et al. | |
| 2023/0412005 | A1 * | 12/2023 | Mitomo | H01Q 3/36 |
| 2024/0006761 | A1 * | 1/2024 | Min | H01L 21/78 |
| 2024/0176439 | A1 * | 5/2024 | Nihei | G06F 3/0421 |

OTHER PUBLICATIONS

International Preliminary Report on Patentability mailed May 19, 2022 in connection with International Application No. PCT/IB2020/060178.
U.S. Appl. No. 17/084,396, filed Oct. 29, 2020, Diebold et al.
PCT/IB2020/060178, Feb. 3, 2021, International Search Report and Written Opinion.
PCT/IB2020/060178, May 19, 2022, International Preliminary Report on Patentability.

* cited by examiner

Figure 2
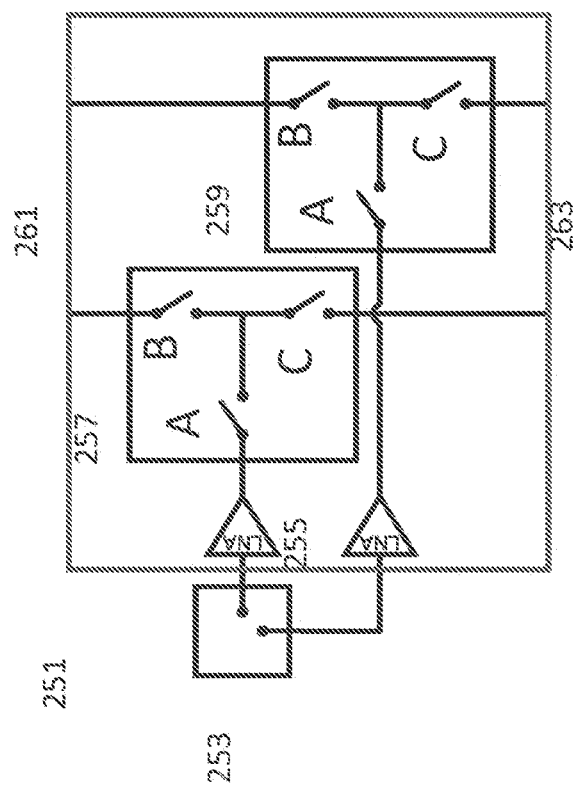
Figure 2(b)
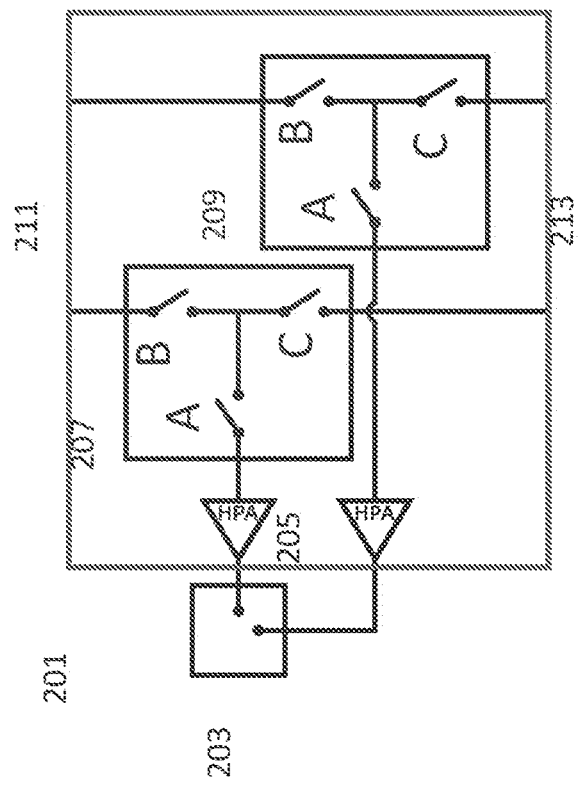
Figure 2(a)

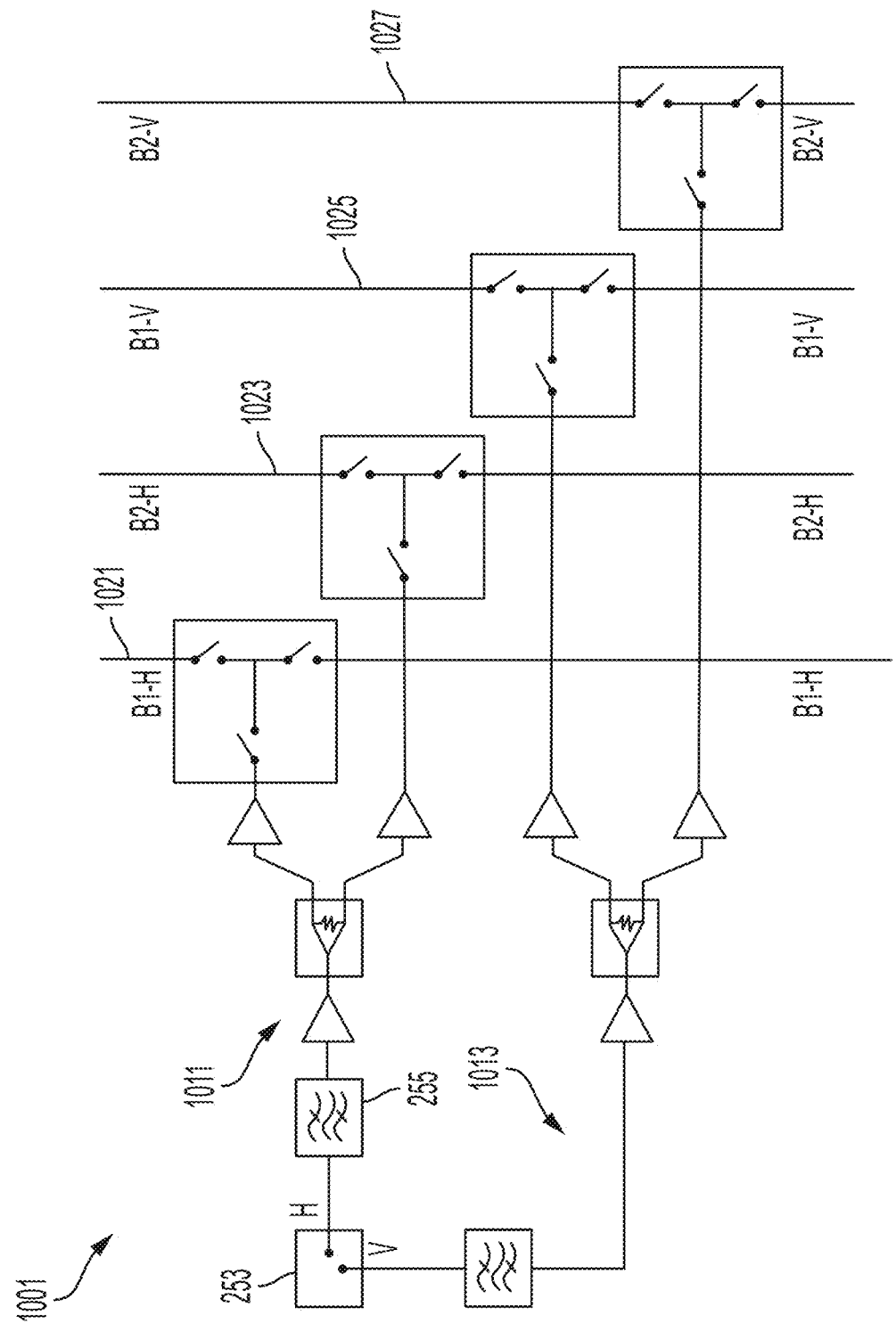

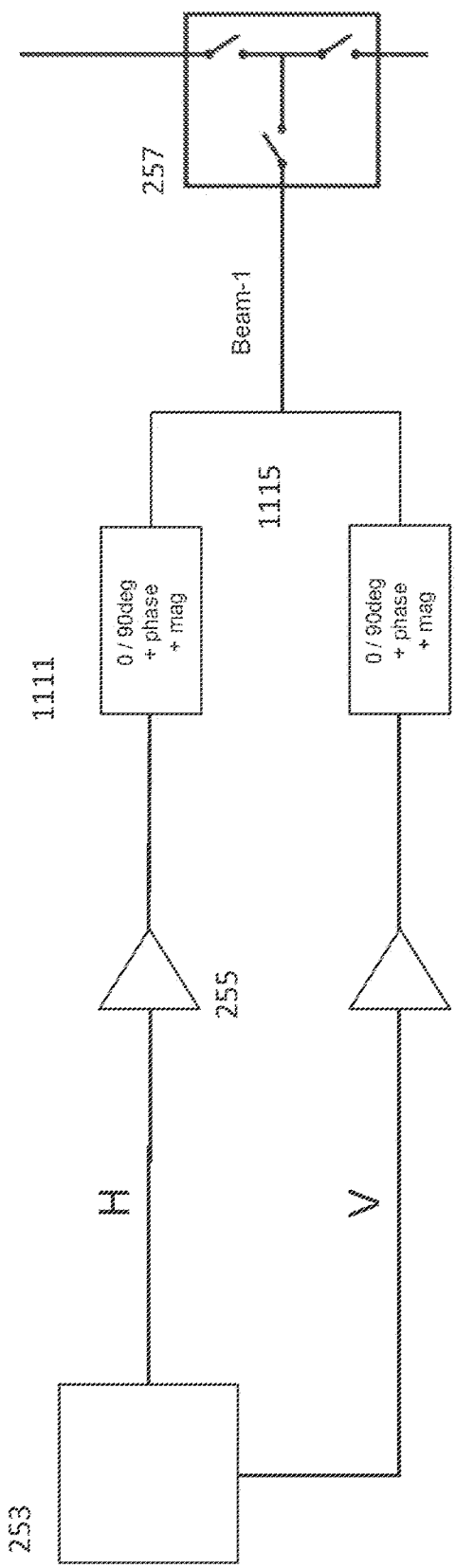

CIRCUIT AND SYSTEM APPARATUS FOR SYNTHESIZING ONE OR MULTIPLE BEAMS ON A SWITCHED-FEED ANTENNA

RELATED APPLICATION

This application is a continuation of U.S. application Ser. No. 17/084,396, filed Oct. 29, 2020, entitled "CIRCUIT AND SYSTEM APPARATUS FOR SYNTHESIZING ONE OR MULTIPLE BEAMS ON A SWITCHED-FEED ANTENNA", which is a non-provisional (under 35 USC 119(e)) of Provisional U.S. Application Ser. No. 62/930,286, filed Nov. 4, 2019, entitled "CIRCUIT AND SYSTEM APPARATUS FOR SYNTHESIZING ONE OR MULTIPLE BEAMS ON A SWITCHED-FEED ANTENNA", the contents of both of which are incorporated herein by reference in their entirety.

FIELD OF THE INVENTION

The present invention relates to beamforming using an array of antenna elements exciting a switched-feed antenna. More particularly, the invention relates to circuit and system methods to create one or multiple beams using a flexible number of antenna array elements in different groups and combinations to realize flexible beam patterns found in analogue and digital beam forming systems for radar, communications and the like.

An example of a switched beam antenna is the multi-beam lens antenna described by Scarborough et. al. "Lens Antenna System", U.S. Pat. No. 10,116,051 B2, which is incorporated herein by reference. In the '051 patent, an array of feed antennas is placed below a dielectric lens, and one or more feeds enabled to produce a beam in a controlled direction from the lens. Multiple such lenses can be combined to form an array with performance corresponding to the aperture size. This invention describes a circuit implementation for effectively selecting one or more feeds from the feed array beneath the lens. This invention can be used to implement the referenced lens antenna, and can be used in combination with the reference to produce lens antenna arrays.

BACKGROUND

Radar and communication systems benefit from antennas allowing multi-beam operation to increase the number of targets that can be separated (radar) and to increase the number of supported users, communication endpoints, or data-rate (communications).

Modern radar systems need to track the movement of two or more targets (planes, vehicles, pedestrians, obstacles) in close vicinity or far apart. Wireless communication systems need to communicate with two or more users whose paths might cross.

Therefore, a need exists in the field of flexible creation of one or multiple beams without reducing the performance of single-beam operation or reduced performance in multi-beam operation compared to the single-beam case. The beams need to be flexible in their pointing direction, allow for a wide range of supported angles and crossing and combination of beams allocated to one user or target.

Analogue and digital beamforming is widely used for radar and wireless communications. An array of antennas is used to create antenna gain and directivity. The beam is steered using all array elements active simultaneously, each at specific phase, magnitude, and potentially time offset.

The direction of a beam created from an antenna phased array can be controlled thru the adjustment of magnitude and phase of the receiving or transmitting antenna elements, which all contribute to the creation of the single beam. If the phase, magnitude, and time control circuitry behind each element is duplicated, it becomes possible for multiple beams to be generated at a significant increase in cost and processing complexity. However, since multiple signals are now being transmitted through a single amplifier, the achievable power for each independent beam decreases when multiple beams are enabled relative to a single beam.

Multiple signals through a single amplifier can also increase interference and nonlinear effects. A digital signal processing (DSP) back-end is the most flexible approach for a multi-beam phased array, which can support many beams (since the circuitry to perform the multiple beamforming is compact and easy to duplicate in the digital domain), but power and cost are very high, since all of the feeds must be sampled and processed. For these reasons, the support of multiple beams using conventional phased array (particularly analog phased arrays) is limited and usually comes with a decrease in performance compared to the single-beam case.

An alternate means of beamforming is the switched-feed antenna, where a number of beams can be generated corresponding to the fixed locations of a number of feeds. This can be implemented in a bulk way with patch antennas or waveguides (or other feed) exciting a dielectric lens, a gradient index lens, or a metamaterial or metasurface lens, or it may be realized by an array of feed antennas whose signals are generated by a circuit such as a Rotman lens or Butler matrix. In either case, enabling a single feed produces a beam in a given direction determined by the structure and geometry of the feed and beamformer system. Multiple feeds can be enabled simultaneously to generate multiple beams in different directions, and in some cases two closely spaced feeds can be excited with the same signal (and potentially a phase, magnitude, or time offset) to provide fine control (for gain, angle, or other beam characteristics) of a single beam.

In a switched-beam antenna, since different feeds generate different beams, there is generally no decrease in performance for increasing the number of beams. However, efficiently selecting which feed or feeds to use when only a subset of the feeds needs to be used at once becomes the challenge. In a switched-feed multibeam antenna, some number of feed ports (antennas, connectors, or circuit ports) are associated with a beamformer (such as a dielectric lens or Butler matrix). One or more of the feeds must be selected to form one or more beams, where one or more feed ports can contribute to a single beam. In some cases, the same feed port can carry multiple overlaid signals, which then can contribute to multiple beams. Different beams will generally carry different signals, for communicating with different endpoints or observing different directions from a RADAR system.

In this setup, when the number of required beams is significantly less than the number of feed points, implementing a full TR chain and especially a full DSP processing chain for each feed point is cost and power inefficient. It is desired that a small number of TR chains and DSP chains be switched in and out as necessary to select the right feed points to generate the desired set of RF beams at a given moment in time.

If there are N feeds, of which a maximum of M are required to be sampled and processed in the digital domain, then in general an N×M RF crossbar switch matrix is required. A crossbar switch matrix can be implemented but is challenging to construct in an efficient way. A full crossbar matrix can result in significantly different line lengths between different elements when the matrix is in different states, and also requires long traces and many points where RF signals must cross, which complicates the layout of the board.

SUMMARY OF THE DISCLOSURE

A circuit has at least one amplifier and a signal routing device such as one or more switches, and an array of antenna elements from which some subset must be enabled and processed at a time. The antenna elements can be grouped in accordance with an organization scheme (such as by column or row in a regular grid, or by separating groups such that elements in the same group are not physically adjacent) to enable more flexibility in selecting and routing the signals. The system is used to create one or more beams, which can be pointed (steered) to a wide range of directions by means of selecting one or more feed antennas in a switched-feed antenna without including full receive and transmit circuitry (DSP, frequency conversion) for each feed in the array. In this case, minimizing the number of DSP chains is desirable to reduce the cost, power, and complexity of the antenna. The resulting beam(s) can be combined and manipulated to support multiple users, track several targets, increase operational range, increase radar resolution, or data-rate in communications.

BRIEF DESCRIPTION OF THE DRAWINGS

FIGS. 2(a), 2(b) show a front-end switching circuit designed for use in a switched-feed antenna.

FIG. 10(a) illustrates a modified circuit architecture that splits the signal into two or more copies to increase signal routing flexibility and the ability to select more feeds within the same column of an array.

FIG. 11 illustrates a modified circuit architecture incorporating analog phase and magnitude control for polarization control that can be combined with the switching system to reduce the number of switching channels and signal paths required.

DETAILED DESCRIPTION OF THE INVENTION

Figure 1:
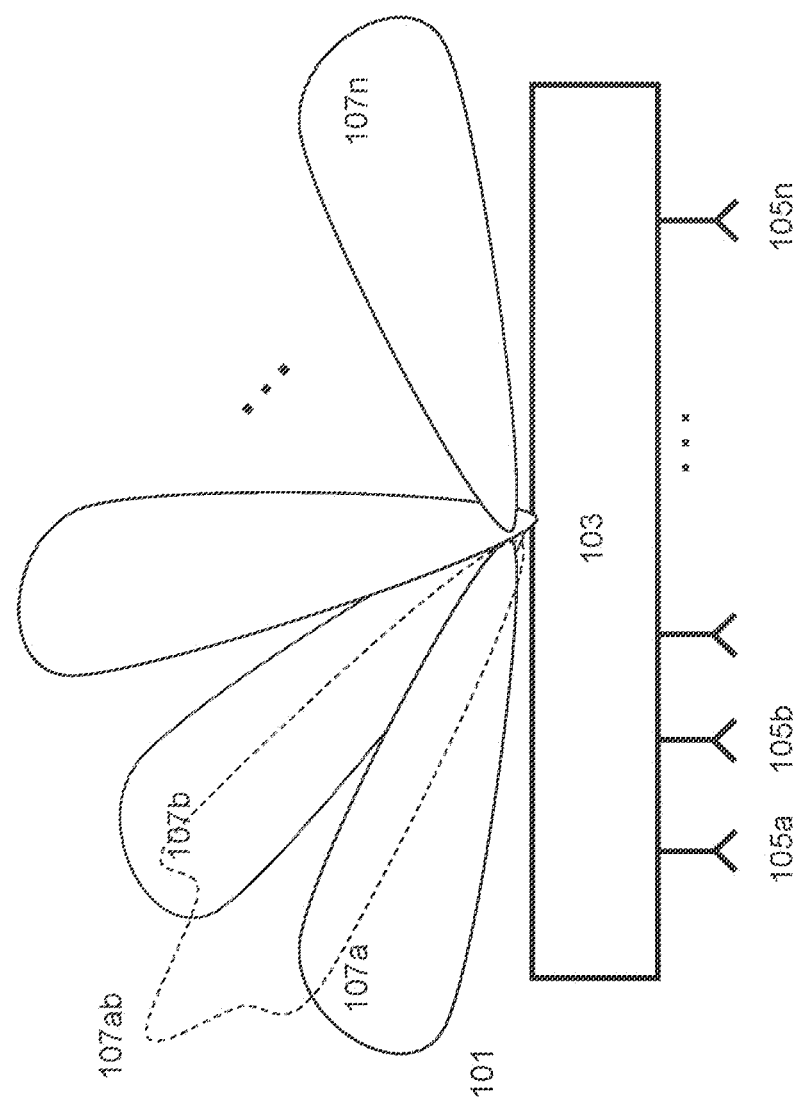
FIG. 1 illustrates a switched-feed antenna system and a synthesized (i.e., formed) beam excited by multiple feeds excited together.

In describing the illustrative, non-limiting embodiments illustrated in the drawings, specific terminology will be resorted to for the sake of clarity. However, the disclosure is not intended to be limited to the specific terms so selected, and it is to be understood that each specific term includes all technical equivalents that operate in similar manner to accomplish a similar purpose. Several embodiments are described for illustrative purposes, it being understood that the description and claims are not limited to the illustrated embodiments and other embodiments not specifically shown in the drawings may also be within the scope of this disclosure.

Turning to the drawings, FIG. 1 shows a switched-beam antenna 101. The antenna 101 has a plurality of fixed feed antennas 105 with an antenna port each associated with a resulting fixed beam 107. The feeds and beams can be distributed along one or two axes (scanning along a line, or scanning across a hemisphere). The distinct feeds and accompanying beams are generally independent, such that separate signals are transmitted in each beam, but multiple feeds (105a, 105b) can be enabled with the same signal to control the shape and properties of the resulting radiation pattern to form a single combined beam 107ab (i.e., you turn on one feed, you get one beam; you turn on a second feed, you get a second beam; if you turn them both on at the same time with the same signal, then the beams combine into a single different beam).

Allowing a restriction in the selection of which feeds for a switched-feed antenna are active allows the switch matrix to be simplified. This invention describes a particular set of restrictions and the resulting circuit architecture that allows a cost, power, and PCB routing-efficient method of implementation of the switching circuitry and therefore an efficient implementation of the switched-feed antenna. Restrictions can include the total number of feeds able to be independently selected, how many feeds per group/column, and/or how many distinct clusters and how many feeds per cluster can be selected.

In the examples, dual polarizations are shown from each feed antenna, but the system could be implemented with only a single polarization as well. The two polarizations, if used, are handled in parallel with the same switches and control system, and are treated as a single signal that is split over two wires and samplers.

For best system performance, a low noise amplifier (LNA) (receive) and high-power amplifier (HPA) (transmit) need to be placed as close as possible to each antenna element to avoid noise figure or output power (and thus efficiency) degradation of the system.

The invention works for both receive and transmit antennas, but for simplicity only the receive implementation is described in detail. The transmit functionality and operation is the same, other than that an HPA is substituted for the LNA, and a DAC for the ADC for the Tx case.

This invention uses one or more switches to allow selecting a feed from among a group of feeds. Rather than a switch tree, an architecture that uses series-connected switches is used.

Turning to FIGS. 2(a), 2(b), a key innovation of this invention is the use of T-switch circuits 251 to allow signals from a feed to be routed in different directions. Each circuit 251 is associated with a feed antenna port, and has two or more signal ports; it can either route the signal up, route the signal down, or disable the feed point and pass a signal on from the up to the down signal port or vice versa. By allowing bidirectional signals, multiple feeds within a switching group can be selected. This doubles the flexibility of the system without increasing the number of parallel lines necessary to route the signal out of the feed array.

An example transmit circuit or system 201, FIG. 2(a), and receive circuit or system 251, FIG. 2(b) are shown, where a patch antenna element 203, 253 is connected to two amplifiers, namely HPA 205 and LNA 255, to transmit and receive, respectively a signal with horizontal and vertical polarization from the two ports on the antenna element 203, 253. Each amplifier 205, 255 is connected to three single-pole-single-throw (SPST) switches A, B, C forming a T-junction 207, 209, 257, 259. The switches within each T-junction can be configured in three different states while maintaining a matched impedance to the RF ports 211, 213 on the transmit system and the RF ports 261, 263 on the receive system.

In the embodiment shown, for each T-junction 207, 209, 257, 259, the first switch A has a first terminal connected to one of the amplifiers 205, 255 and a second terminal connected to a first terminal of each of the second and third switches B, C. The second and third switches B, C each have a second terminal connected to a respective RF port 211, 213. The options in each case are to close switches A and B and open switch C (connecting the amplifier output 205, 255 to the top output port 211, 261), close switches A and C and open switch B (connecting the amplifier output 205, 255 to the bottom output port 213, 263), or to close switches B and C and open switch A (isolating and disabling the amplifier, and providing a through connection between ports 211, 261 and 213, 263. There is exactly one path open in each case, in order to maintain the impedance match. Although the two signals for the two polarizations can be routed and processed separately (in the sense that T-junction 207 can close switches A and B, while T-junction 209 can close switches A and C, i.e., one polarization to the top and the other to the bottom), they will be treated the same in most cases (207 and 209 both connected in the same direction).

Later drawings and descriptions only show the receive circuits 251, but the corresponding transmit circuits are the same other than the substitution of an HPA 205 for the LNA 255, and a DAC (Digital to Analog Converter) for the ADC (Analog to Digital Converter) 503, and so are not shown.

Figure 3:
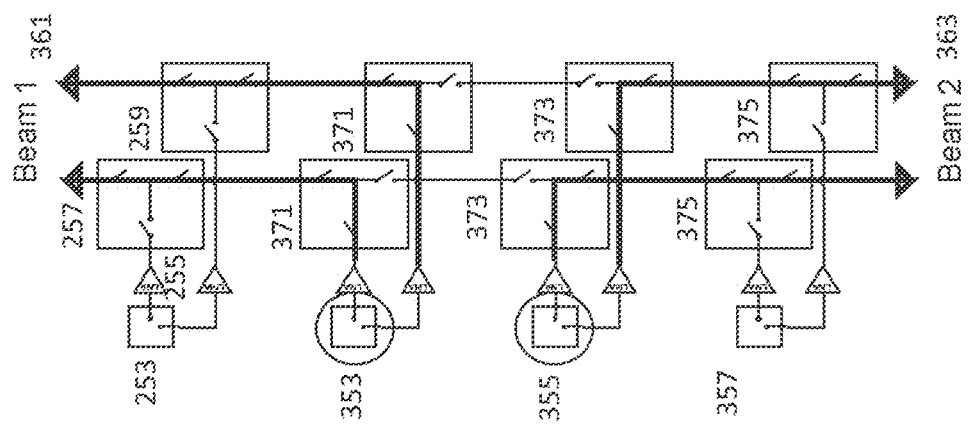
FIG. 3 illustrates how the switching circuits are interconnected and cascaded to allow multiple feed points to be selected simultaneously within the same column, with one feed point signal selected to propagate up, and the other feed point signal to propagate down.

The circuit illustrated in FIGS. 2(a), 2(b) is cascaded with other transmit or receive circuits 201, 251 to form a column in FIG. 3. The example shows two incident signals for selected patches 353 and 355, for which the signals are desired to be routed to the beam 1 column port 361 and beam 2 column port 363, respectively. The switches 371 are set to route one signal to the top (A+B closed, C open) 361 and the switches 373 set to route the second signal to the bottom (A+C closed, B open) 363 of the column. The other elements of the column 375 pass the signal thru (B+C close, A open) from the bottom port to the top port or vice versa, disabling the amplifiers 255. The input impedance through the selected path remains matched at the characteristic impedance in all cases throughout the system, since a single open path is always maintained, unlike a system where a different number of switches may be open or closed at the same time. More patches with corresponding switches can be added to the column, of which any two can be selected to be brought out to the two column ports at top and bottom of the interconnected column. The selected patches 353, 355 (indicated by the circles) are routed through the closest beam port; the patch 353 is closer to the beam 1 port 361 than is the patch 355, so it must be routed up through switch 375. Similar logic is followed for the patch 355.

The array of feed points for the switched-feed antenna is divided into groups, where each group is connected to one or more channels for the ADC. In the simplest form, one feed from each group can be activated at once, if the T-switches are used to route signals in the "up" direction only, either to select a patch or to bypass a patch. If both sides of the switch series are connected to a DSP circuit, then any two feeds from that group can be sampled. If groups are interconnected using the same switch circuit 251, then subgroups can be formed to increase the granularity by which individual feeds can be chosen.

Turning to FIG. 4(a), groups can be selected in different ways, such as geometrically, randomly, or for ease of routing. The highest benefits are demonstrated when the feeds belonging to the same group are not directly adjacent to each other in the feed point array, so that clusters of feeds to drive a single beam can be enabled in close proximity, one from each group.

The example of FIG. 4(a) shows a system using an antenna array layout composed of multiple independent groups of patches (here shown as columns), rather than the single column in FIG. 3. Arranging into multiple separately interconnected columns or groups, where each group is connected through the series of T-switches, allows more patches to be selected simultaneously. The example illustrates three groups of array elements, with each group identified as a unique identifier (b, g, r). The signals from patches in one column can then be combined with signals from patches in the same or different columns, as long as no more than two patches are selected per column. Only two patches may be selected per column as shown, as each column has an upper and a lower port (e.g., b1 & b2, or g1 & g2) One of the two selected patches (illustrated in FIG. 4(a) by circles around the selected patches 453, 453a, 473, 473a, 483, 483a) is connected to the bottom port of the column, and the other selected patch is connected to the top port of the column. The previously described T-switch circuit (or a similar circuit, or a passive circuit) is used to route the signals while maintaining the impedance match.

The system as drawn supports six active antenna elements 453, 453a, 473, 473a, 483, 483a (two active elements per column). More or fewer columns can be used to change the number of supported simultaneous active elements. The signals from the active antenna elements can be combined using RF circuits in the analog domain, or after sampling in the digital domain to create one to six beams signals. Summing the signals (with appropriate magnitude, phase, and time offsets) from multiple active array elements (or, "clustering" the feeds) into a single signal can yield performance benefits. Antenna elements can be clustered to improve system pointing resolution and array gain. Selections 491 and 493 show potential clustering options for the active array elements 453, 473, and 483. Clustering of any number of elements between 1 and 6 is possible with this configuration. Each distinct cluster uses patches that are directly adjacent with each other, but can be in various shapes. Only one feed can be switched up and one switched down in each column, but a single patch in a column is possible.

Here the signals are shown as being extracted at both top and bottom ports of the array to allow the collection of information from six antennas. A reduced complexity system supporting only one antenna element per column is possible if for example the signals are routed to the centre or only the top or bottom and combined there.

Figure 4:
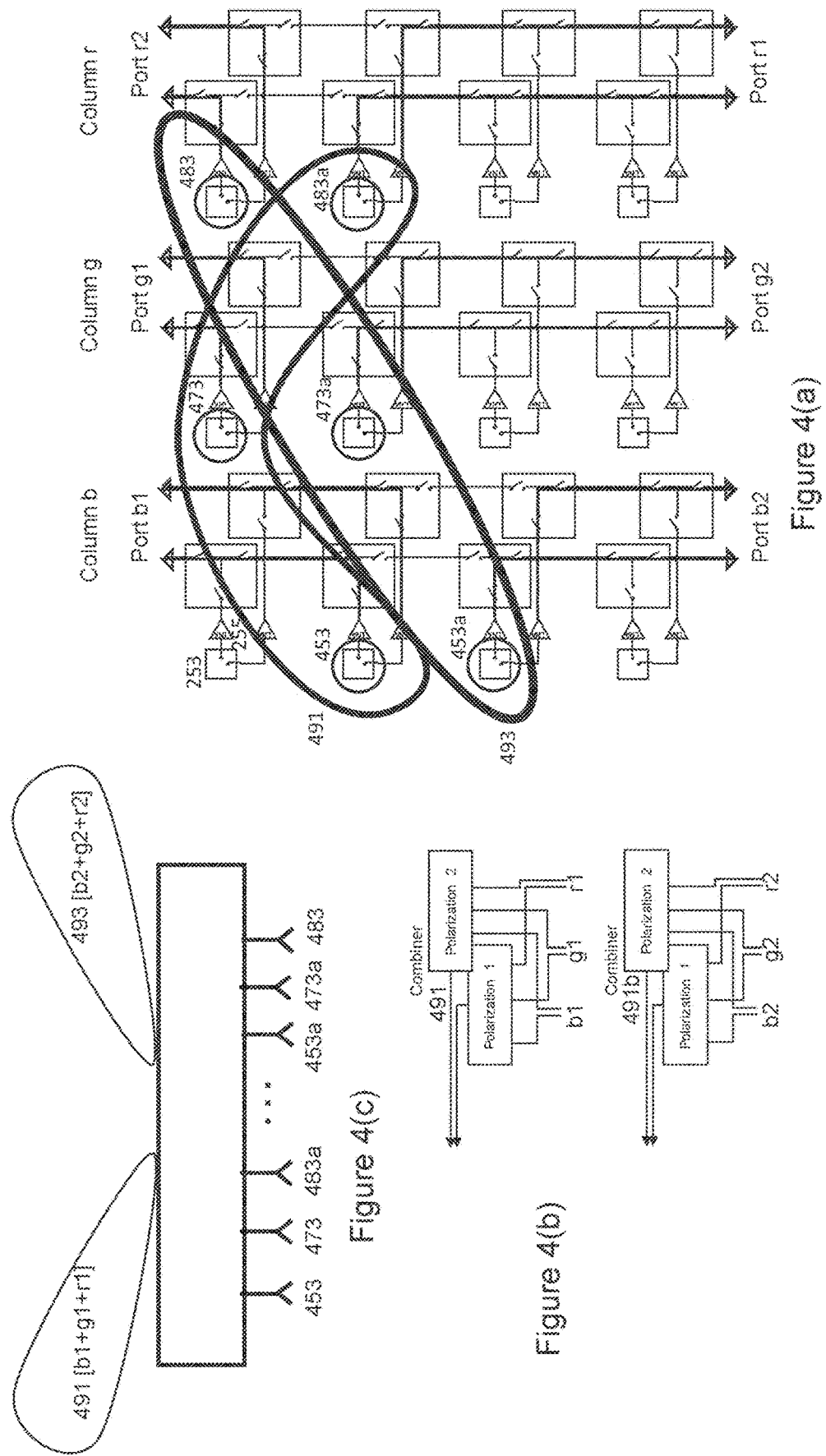
FIG. 4(a) demonstrates how arrangement of feed points in multiple groups or columns enables a flexible selection of feeds to be combined.
FIG. 4(b) shows the combiners.
FIG. 4(c) shows the combined beams.

The signals for each beam are brought together by the combiner 491, 493 (FIG. 4(*b*), which sums the signals, potentially with magnitude, phase, and time offsets between the signals. The combined beams are shown in FIG. 4(*c*). The first combiner has a first polarization device and a second polarization device that are each coupled with and receive one of the signals at ports b1, g1, r1 from the columns, combine those signals and output a combined signal 491.

The controller decides which port to connect with each of the polarization devices of each combiner. Thus, in the example shown, the controller selects for the first polarization device 1 to be coupled with and receive the first signal from ports b1, g1, r1, and the second polarization device 2 to be coupled with and receive the second signals from ports b1, g1, r1. And, the second combiner has a first polarization device and a second polarization device that are each coupled with and receive one of the signals at ports b2, g2, r2 from the columns, combine those signals and output a combined signal 491. Here, the first polarization device 1 couples with and receives the first signal from ports b2, g2, r2, and the second polarization device 2 couples with and receives the second signals from ports b2, g2, r2. However, the controller can connect any of the antenna elements 453, 473, 483 with any of the ports b, g, r, and can connect any of the ports b, g, r with any of the combiners, depending on the desired beam and beam properties to be attained. The combined beams 491, 493 are shown in FIG. 4(*c*).

The example shows an array of antenna feed elements logically arranged in multiple columns, where at least two elements are in each column. Although described as a column, the feeds belonging to a single column need not be physically arranged in a column, but may be arranged in other shapes or geometric patterns. One example arrangement would be to alternate elements from each column to form a square or rectangular grid, or a hexagonal grid. In particular, arrangements in which no two feeds belonging to the same column are physically adjacent is beneficial for allowing flexible selection of different feeds across the set of feeds. A minimum of four logical columns or groups of feeds are required to achieve this condition for a rectangular or square arrangement, while only three logical columns or groups are necessary to satisfy this condition for a hexagonal arrangement of feeds. The columns of patches as shown do not need to be physically arranged as columns, but can be arranged in any way that is convenient. The elements of the array are assigned to multiple groups (shown here as three) to allow for many allowed clusters of antenna elements. Using the same circuit 251 as used within each column also at the top and bottom of each column allows the signals from multiple columns to be selected in the same way as the signals from multiple elements can be selected simultaneously within each column.

Figure 5:
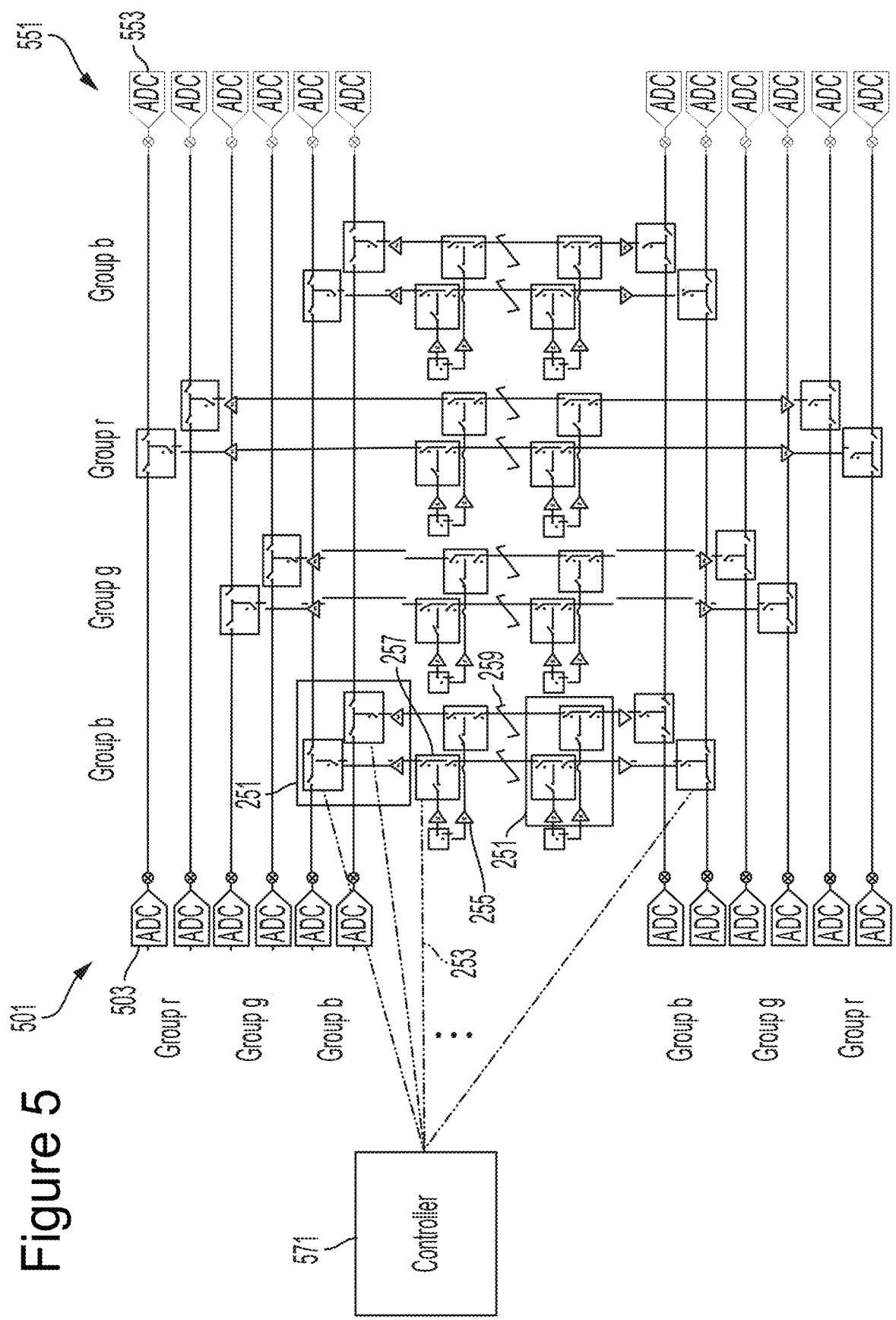
FIG. 5 is an example of interconnecting columns of feed points using the same switching circuitry for selecting feed points to assign rows into groups.

Referring to the example of FIG. 5, the signal starts at a patch 253, through the amplifier 255, and is then routed appropriately up or down by the switches 257, 259. Then, at the top and bottom of each column, additional instances of circuits 251 are placed to send the signal left 501 or right 551 to mixers and DSP circuits 503, 553. Once sampled, the signals can be summed to cluster the selected feeds or left isolated, or any combination. Placing an amplifier and T-junction at the top and bottom of each column allows for up to four patches per interconnected group to be selected and activated simultaneously, and also minimizes the signal attenuation between the feed and the sampler, since the top and bottom amplifiers boost the signal.

Many combinations of patches are possible using this method. The system as shown allows up to 12 patches to be enabled and signals sampled simultaneously. If only 6 are required, the right bank of samplers 551 can be removed. If only three patches, then the bottom bank of samplers could be removed as well. Both of these removals still allow all of the patches to be accessed, but restrict the number that can be accessed simultaneously. Varying numbers of patches can be accommodated with more or less flexibility as to the placement by implementing more or fewer columns and groups of columns b, g, r and how many ports allow outputs to be sampled. With any number of columns and elements in a column, up to two patches can be activated per column, and up to six columns can be activated at once (top and bottom for each of the three groups of columns). Different polarizations can be supported by processing the sampled vertical and horizontal polarization signals in the digital domain. The controller 571 selects the settings of each switch circuit 251 in order to route the signals from the selected patches to the appropriate output ports.

Figure 6:
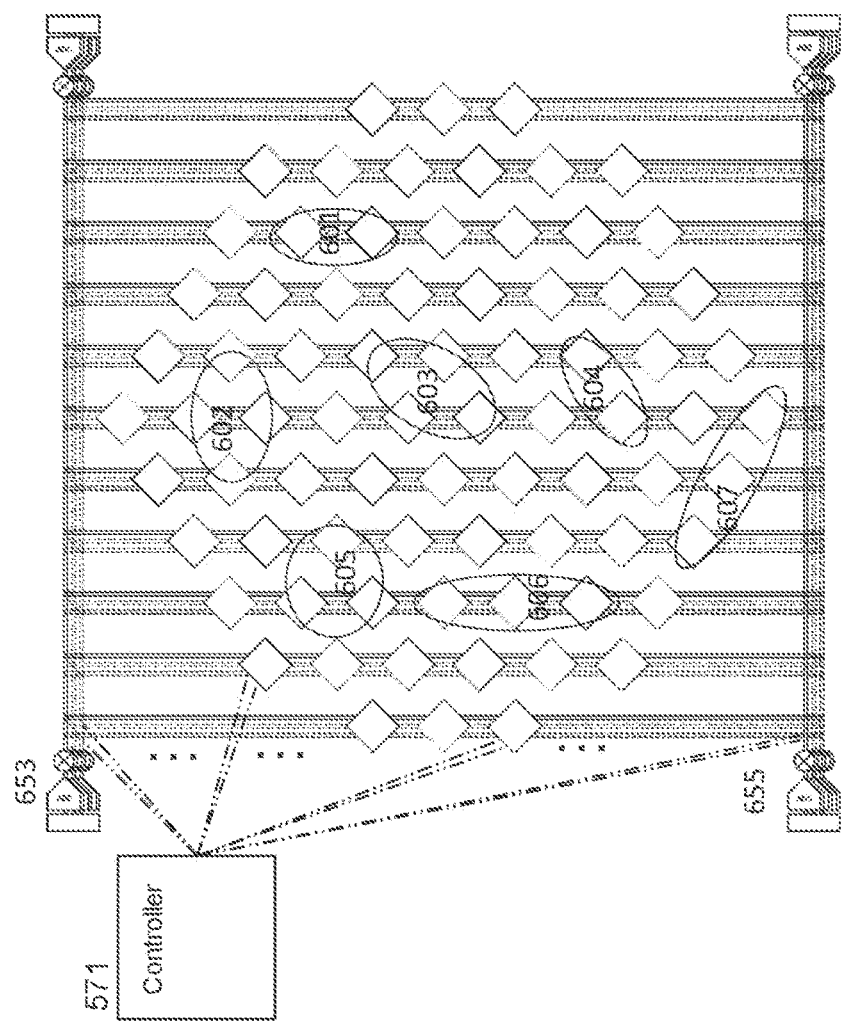
FIG. 6 illustrates a particular arrangement of feeds belonging to different groups and the various ways in which feeds may be selected.

This arrangement can be performed by assigning each feed point to a group, as in FIG. 6, such that no two feed points of the same group are directly adjacent, and using the set of all patches of a given group as the groups of feed points. If two feed points of the same group are directly adjacent, then it over-restricts the clusters that can be formed when one or two feeds per group can be selected simultaneously. Different numbers of groups can be supported, including (but not limited to) 1, 2, 3, 4, and 6, in a way similar to spectral reuse patterns in cellular and satellite networks. In general, any number of groups that can be used to efficiently tessellate the set of feeds and support the desired number of feeds is possible.

The groups of feed points can be divided further, such as dividing each group into columns, as shown in FIGS. 3, 4, and 5. The feeds of a given group in each column form the subgroups, which are then combined at top and bottom of the array through the T-switches to allow up to four feeds per group to be selected at once. The number of DSP sampling circuits can be controlled as necessary to meet the requirements of the system.

FIG. 6 shows an array of patches in three logical groups (delineated in the figure by solid, dashed, and dotted lines and feeds) arranged in vertical lines with connections column port connections for each group at the top and the bottom. This geometric arrangement of three groups of feeds such that no two feeds are physically adjacent yields advantages in feed selection flexibility. As groups of 2-4 feeds are commonly desired to be combined in the receivers 653, 655 to form a beam, it is desirable that the selection of which 2-4 feeds be relatively unconstrained. Using this physical arrangement means that any two triangles of three feeds may be selected across the array, and if one group of four feeds is selected, almost any remaining group of two can be selected. Each patch is connected to the column with circuit 251, and additional circuits 251 connect each column to the top 653 and bottom 655 output ports.

The diagram shows the columns and connections running vertically, but the connections and columns can be oriented in any convenient direction relative to the patch layout and distribution.

This configuration allows multiple clusters of patches to be selected simultaneously, as long as no more than two patches are selected for each group, no matter which column is used. All of the highlighted antenna clusters (601 to 607) are allowed. Additional, not explicitly highlighted antenna clusters are also possible. As an example, the described system can support a beam with pattern one and a second with pattern 2 simultaneously. This is due to the described circuit, its arrangement into columns, and the further organization of the array into groups. The signals from any two three-element clusters (each comprising one patch from each of the three groups) can be brought out to the output ports 653 and 655 to be sampled, processed, and mathematically combined in the digital domain.

The circuit 251 can route a signal to or between only two ports, 261 and 263. Increasing the number of outputs of the switch increases routing flexibility: from two to four (for the four cardinal directions), to six (for elements in a hexagonal grid) to eight (to include the diagonals). An illustration in FIG. 7 of the expanded circuit 751 to form both rows and columns with four outputs 761, 763, 765, 767, which increases the flexibility of routing signals, including the option of routing signals in angled or non-straight-lines. Signals are run in parallel with duplicate switches 757, 759 for both polarizations. This can be further extended to include diagonal interconnects, although this option is not shown. In all cases, only two switches (A, B, C, D, and E) are closed at a time to maintain the impedance match of the circuit.

Figure 7:
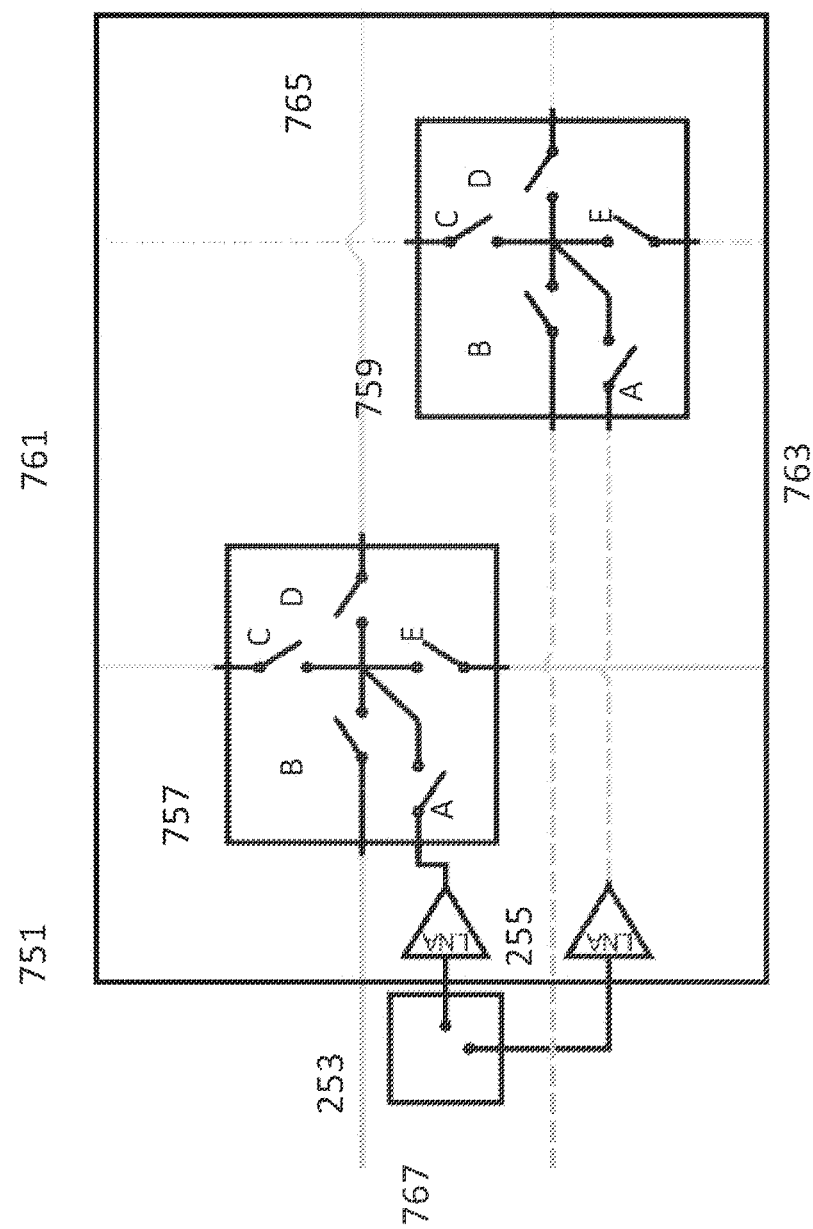
FIG. 7 shows a modified circuit that can route signals in four directions rather than only two, enabling more combinations of feed points to be selected simultaneously.

The circuit 751 shown in FIG. 7 can be cascaded into rows and columns. The columns are combined at the top and bottom, the rows are combined at the left and right. Signal conversion and sampling is done on each side of the four cardinal points.

In the shown example the array supports four beams with three antenna elements each. Up to 12 single-antenna beams are possible. The same patch can be applied to multiple beams without reducing system performance in receive mode, but power limitations may reduce achievable performance if multiple beams are sharing a single feed in transmit mode.

Figure 8:
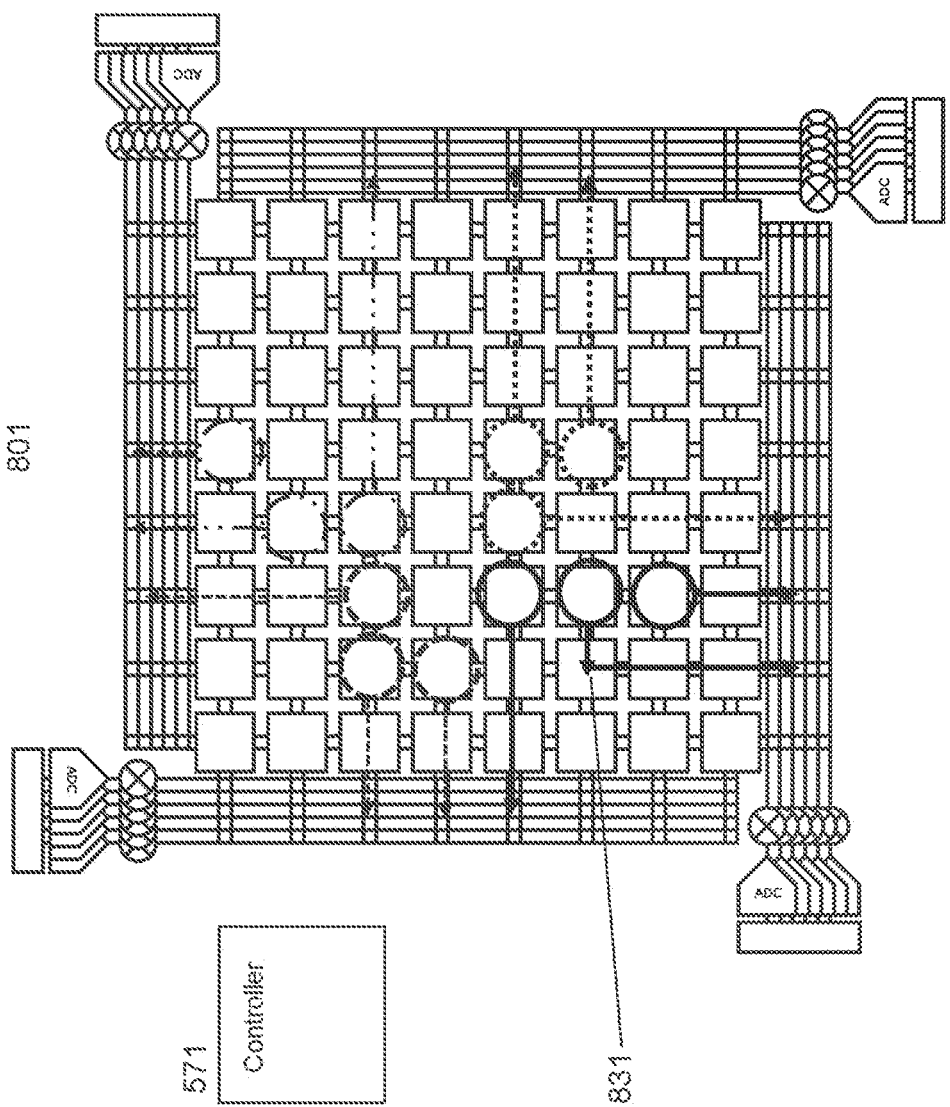
FIG. 8 shows an arrangement of four-port switches and their interconnection into an array with the option to select (almost) any 12 feeds from the array.

Turning to FIG. 8, signals can be routed around the corner 831 as shown in the r beam example to further increase system flexibility. However, the added flexibility must be balanced against the increased routing difficulty and increase size and cost of the chip due to the increased number of RF ports required.

Figure 9:
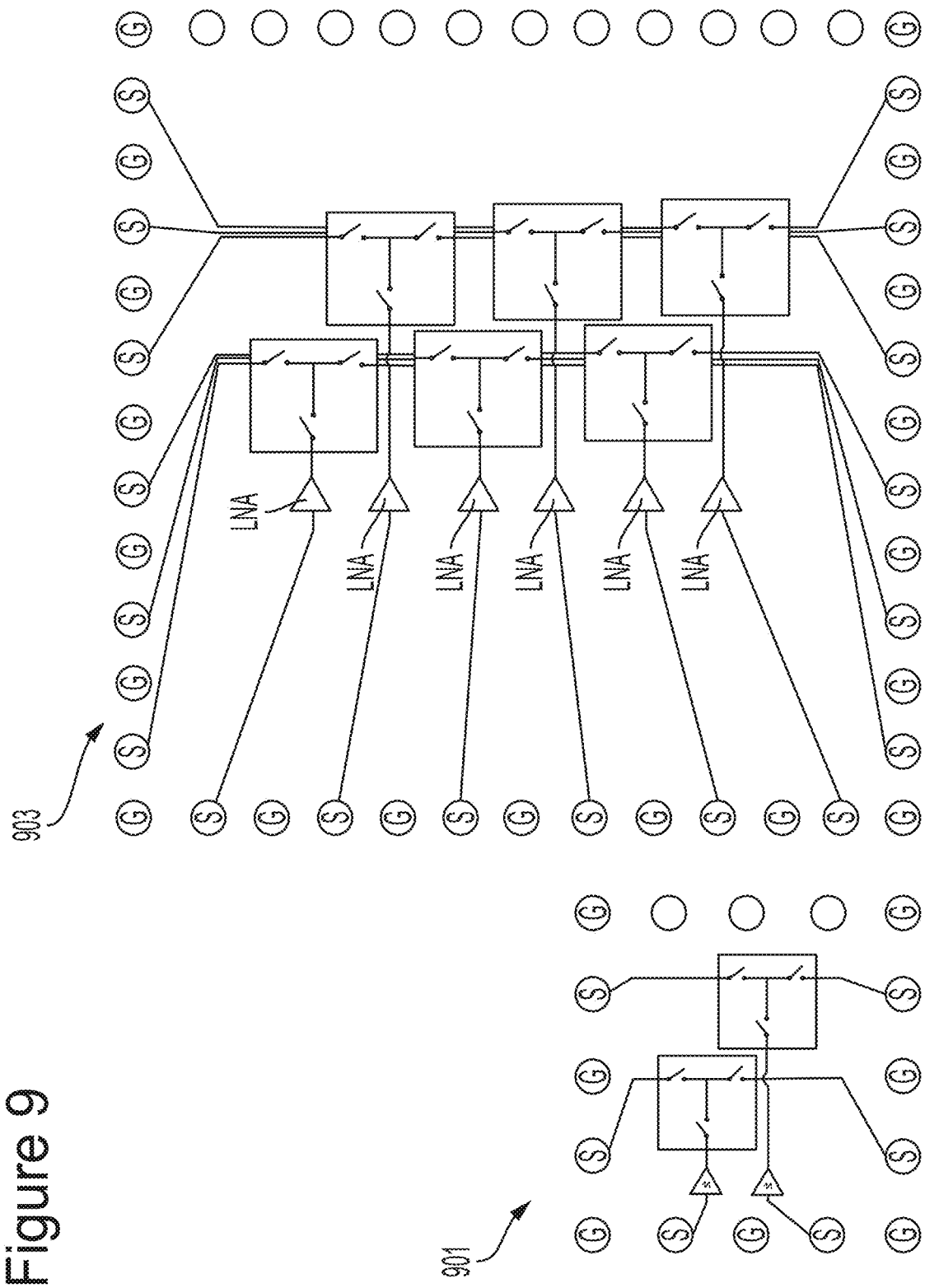
FIG. 9 illustrates potential circuit implementations of two and 6 amplifier and switch combinations.
Figure 10B:
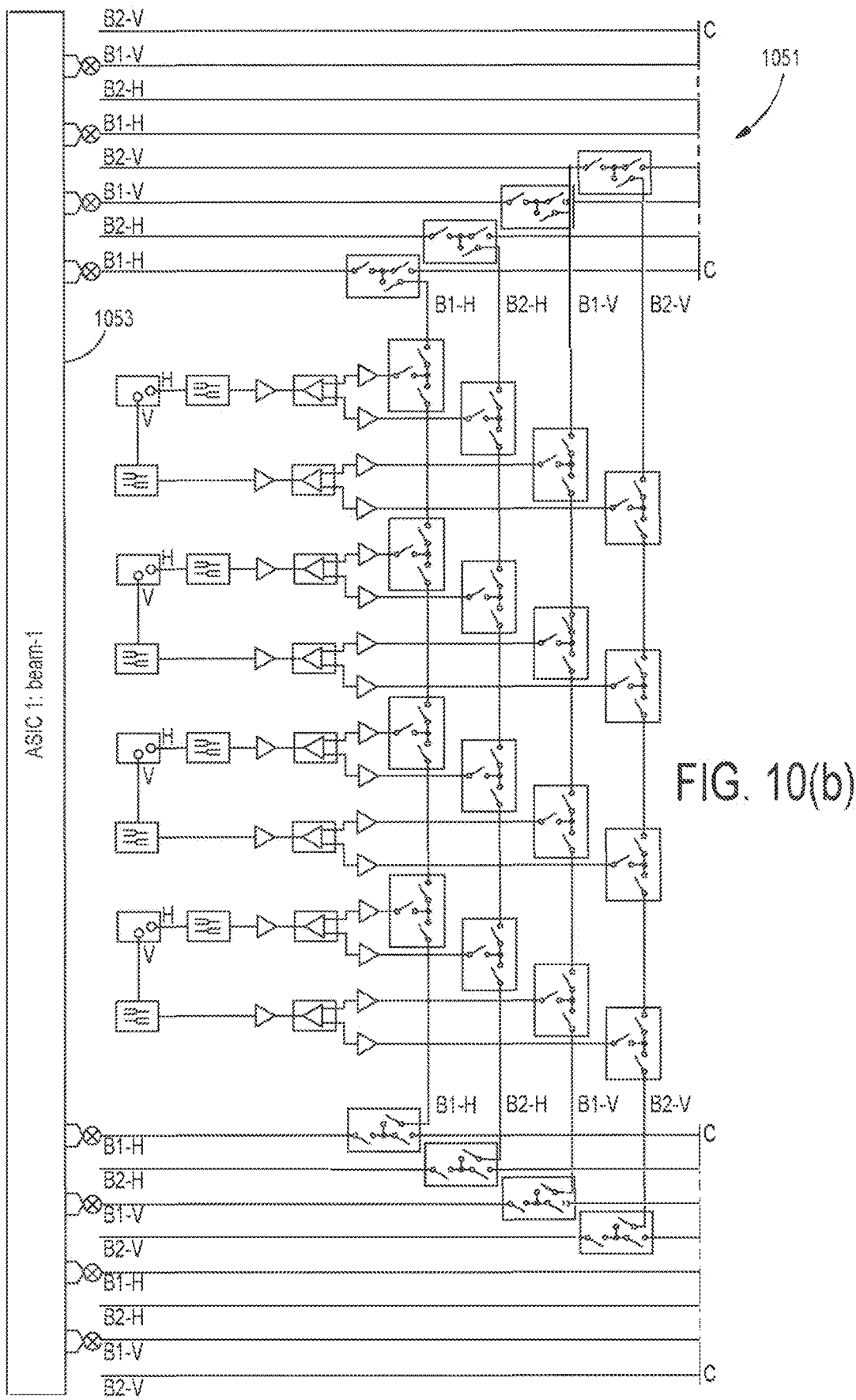
FIGS. 10(b)-10(e) illustrate an array constructed with signals from each polarization of each patch split two ways to be routed along a total of four channels, allowing up to 16 total channels to be selected at once and sampled by two ASICs as two beams.
Figure 10C:
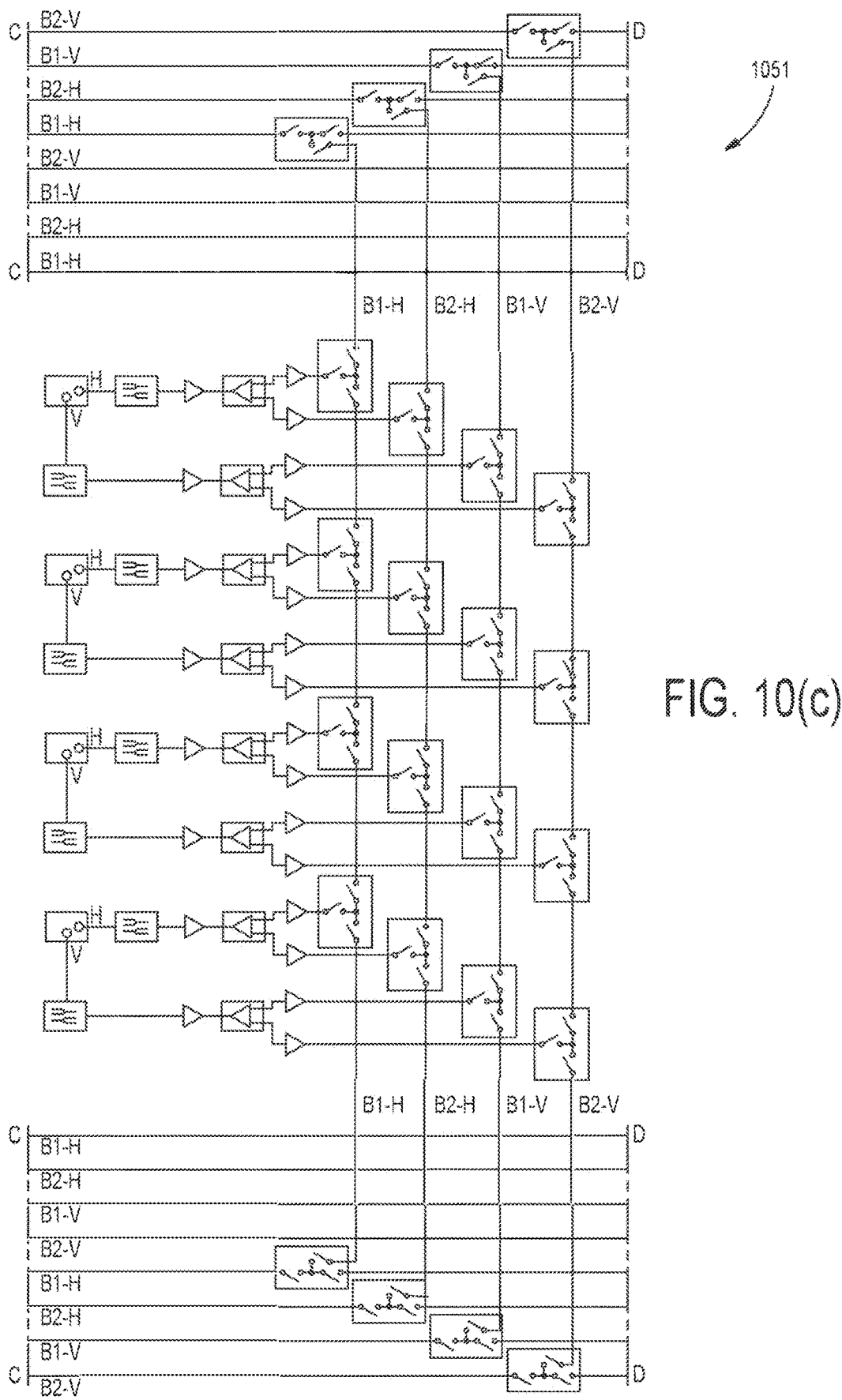
Figure 10D:
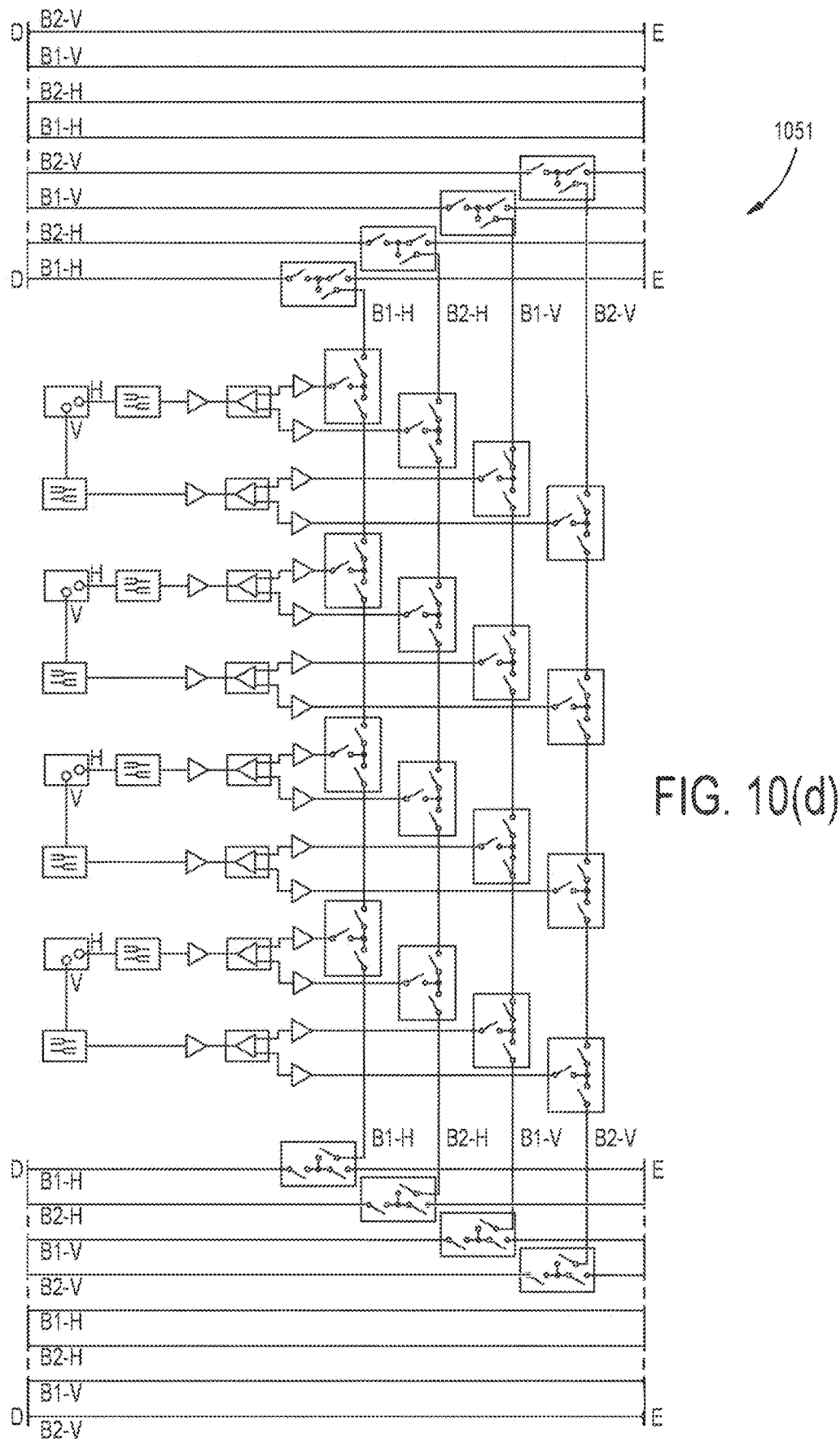
Figure 10E:
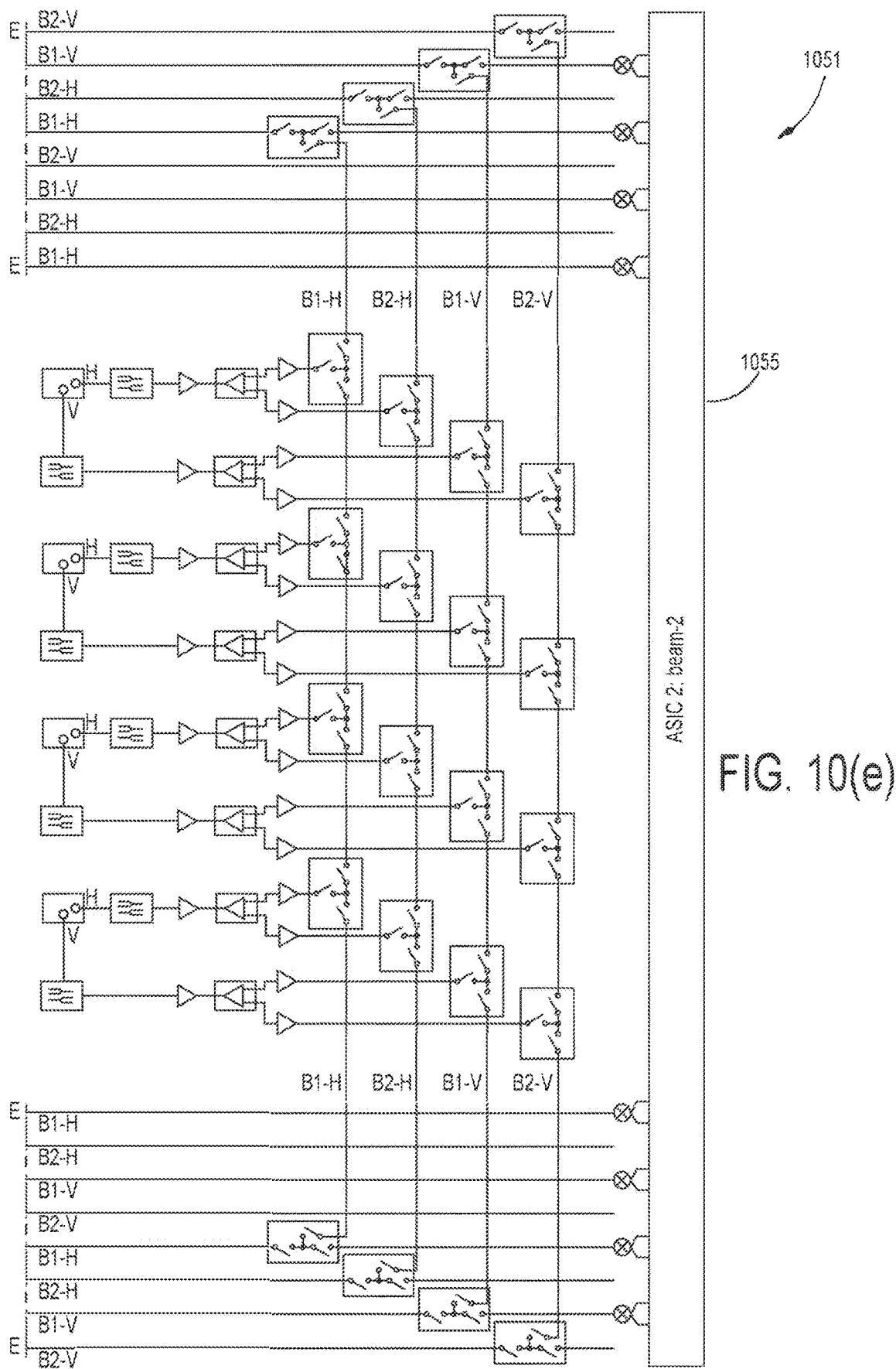

The circuits 251 can be implemented as custom integrated circuits (ICs) on Silicon, CMOS, GaAs, or any other IC process. Different number of circuits can be grouped onto one IC. As illustrated in FIG. 9, options include, but are not limited to, the circuits 251 necessary to support a single feed 901, or multiple copies of the circuit 251 necessary to support a single feed for each of three feed element groups 903. There are benefits and disadvantages to both approaches. Example pin configurations are demonstrated for each of the examples.

An extension of the circuit 251 to relax the restrictions of how many feeds may be selected simultaneously is illustrated in FIG. 10(*a*). The circuit 1001 (shown as a receive circuit with LNA, but also implementable as a transmit circuit with High-Power Amplifier (HPA) or Solid-State Power Amplifier (SSPA)) operates in an analogous fashion to 251, but includes a power divider 1011, 1013 (such as a Wilkinson power divider) for each polarization path to duplicate the signal and allow it to be sent along one of two parallel switching paths 1021, 1025 or 1023, 1027. In this way, each column has additional signal paths to allow more than one signal to exit each port; as illustrated, four patches in a group connected by circuits 1001 could be selected (Beam 1 and Beam 2, top and bottom), rather than only two in a group connected by circuit 251 (top and bottom only). The figure shows a 2:1 power divider and two parallel paths, but the circuit may be implemented with any other splitter ratio and any number of parallel routing paths. This extension is further illustrated as a larger circuit 1051 in FIGS. 10(*b*)-10(*e*). This extension removes the restriction that only one feed point may be selected per column per polarization, and increases the flexibility of selecting and enabling feeds for second and additional beams.

As illustrated in FIG. 11, a modified circuit can be used to combine the signals from the two polarizations of the feed 253 after applying magnitude, phase, and time shift, before routing to the switching circuit 257, reducing the total number of switches and required number of channels. This is an alternative to maintaining the signals from the two polarizations of each feed point separate to be independently sampled, as illustrated in the previous examples. This is performed by applying a phase shift and magnitude offset (and optionally time delay) 1111 to the signal after the amplifier 255, and then recombining 1115 the signal with the corresponding signal from the opposite polarization before continuing with the previously described switching architecture.

Performing the polarization control by setting the relative magnitude and phase of the horizontal (H) & vertical (V) polarization signals in the front end of the switching circuit reduces the number of channels that need to be propagated to the digital signal processing system or other receiver, simplifying the circuit layout and potentially reducing cost. However, selecting the polarization at the feed reduces the flexibility for selecting additional polarizations in post-processing, and so a trade-off must be considered as to whether to apply polarization in the front- or back-end processing. This circuit can be extended with the option illustrated in FIG. 10, where power dividers are included to split the signals prior to switching, to allow multiple polarizations to be extracted from the same feed 253 at the same time.

The number of feeds in a group or subgroup should be limited, since each switch will impose an insertion loss on the signal. On the receive side, if too much loss is incurred after the LNA, the noise figure of the signal can be degraded. The path loss, time delay, and phase to each feed to each of the available samplers will be different, and will need to be calibrated out of the resulting signal to allow accurate combinations of signals from multiple feeds. Minimizing the length of the series chain before passing through another amplifier will improve the signal integrity.

The beamforming system is associated with a processing device such as a controller or processor 571, where the controller determines the desired beam direction or directions, and determines which feeds or combination of feeds is necessary to sample into the digital domain in order to form the beams. The controller then uses a route-finding algorithm to determine which settings each switch in the array should take on in order to bring those signals to the appropriate DSP chains, and coordinates with the DSP chain to perform the right calculations on each signal. Changing the direction of one beam may require a rerouting of one or more signals to a different DSP chain for a second beam, which must be accounted for in further processing of the signals in the greater system.

The controller may be an FPGA, microprocessor or microcontroller running a software program with data and storage for applying calibration constants, or may be a hardware circuit. The invention can also be implemented by or on a non-transitory computer readable medium, such as any tangible medium that can store, encode or carry non-transitory instructions for execution by the computer and cause the computer to perform any one or more of the operations of the invention described herein, or that is capable of storing, encoding, or carrying data structures utilized by or associated with instructions.

The controller can communicate with and control the settings of each switch in several ways. If sufficient ports are available, the settings to each switch can be transferred in parallel with dedicated traces or wires to each switch chip. Or, a serial data protocol (such as SPI or I2C) can be employed in a daisy-chain configuration. In either case, a synchronization signal may be employed to ensure that all of the switches change states at the same time as the DSP chains update their configuration, and a separate or same synchronization signal may be used to power on or off the amplifiers to ensure that they are warmed up and stable before their outputs are used.

The controller can dynamically configure the state of the switching circuits based on real-time communications behavior, such as changing the direction or number of beams to track a varying number of moving targets or from a moving platform.

The same series or parallel interface may be used to transfer information about the switch circuit (such as a temperature or power sensor) back to the controller, or transfer calibration signals to/from the switch circuit.

One benefit of this invention is that the number of DSP chains and therefore the number of beams and degree of feed clustering allowed can be set independently of the number of feeds. Very large feed arrays can be supported with relatively small number of DSP chains, and still support multiple beams with nearly arbitrary clustering between feeds.

The invention uses one or more switches to combine, split, or route the transmit or receive signal. As an alternative to switches, passive circuit components such as hybrid couplers or Wilkinson dividers can be used. The amplifier(s), switch(es), and passive components can be monolithic integrated or realized on different substrates using discrete components.

The amplifier and switch arrangement are placed several times to create a system, which can be used to create one or more beams.

Because of the system arrangement, each array element can support signals with different polarizations, as well as signals with different frequencies.

Array elements can be part of one or more beams without performance degradation as the antenna element is not combined in analogue domain with other elements of the array to establish the beam but in digital domain.

This invention can be used to produce receive-only and transmit-only switched-beam antennas. Combining both Tx & Rx amplifiers and/or switching circuits together can produce a bidirectional switched-beam antenna that can operate in half-duplex Time Division Duplex (TDD) mode, or full-duplex Frequency Division Duplex (FDD) mode. The design of the switching circuits can be modified to allow for individual patches to both transmit and receive with the addition of transmit amplifiers to the receive chain, and either a transmit/receive switch for a TDD operation, or additional routing paths provided to allow transmit and receive signals to be in operation simultaneously.

It is further noted that the drawings may illustrate and the description and claims may use several geometric or relational terms, such as columns, rows, corner, perpendicular, rectangular, and hexagonal. In addition, the description and claims use several directional or positioning terms and the like, such as vertical, horizontal, top, bottom, left, right, up, and down. Those terms are merely for convenience to facilitate the description based on the embodiments shown in the figures, and are not intended to limit the invention. Thus, it should be recognized that the invention can be described in other ways without those geometric, relational, directional or positioning terms. In addition, the geometric or relational terms may not be exact. For instance, elements may not be exactly rectangular or hexagonal but still be considered to be substantially rectangular or hexagonal because of, for example, tolerances allowed in manufacturing, etc. And, other suitable geometries and relationships can be provided without departing from the spirit and scope of the invention.

The foregoing description and drawings should be considered as illustrative only of the principles of the disclosure, which may be configured in a variety of shapes and sizes and is not intended to be limited by the embodiment herein described. Numerous applications of the disclosure will readily occur to those skilled in the art. Therefore, it is not desired to limit the disclosure to the specific examples disclosed or the exact construction and operation shown and described. Rather, all suitable modifications and equivalents may be resorted to, falling within the scope of the disclosure.

The invention claimed is:

1. A switched-feed antenna system comprising:
a first antenna element and a second antenna element;
a first switching circuit coupled to the first antenna element, wherein the first switching circuit is a T-switch circuit including at least three switches and is configured to direct a signal from the first antenna element to a first port of the first switching circuit or to a second port of the first switching circuit based on a setting of the at least three switches of the first switching circuit;
a second switching circuit coupled to the second antenna element, wherein the second switching circuit is a T-switch circuit including at least three switches and is configured to direct a signal from the second antenna element to a first port of the second switching circuit or to a second port of the second switching circuit based on a setting of the at least three switches of the second switching circuit, wherein
the first switching circuit and the second switching circuit are in separate logical columns such that the first port of the first switching circuit and the first port of the second switching circuit are not connected and the second port of the first switching circuit and the second port of the second switching circuit are not connected;
a first combiner configured to combine the signals at the first port of the first switching circuit and the first port of the second switching circuit into a first combined signal, wherein the first port of the first switching circuit and the first port of the second switching circuit in the separate logical columns are separately coupled to the first combiner; and
a second combiner configured to combine the signals at the second port of the first switching circuit and the second port of the second switching circuit into a second combined signal, wherein the second port of the first switching circuit and the second port of the second switching circuit in the separate logical columns are separately coupled to the second combiner.

2. The switched-feed antenna system of claim 1, further comprising a third switching circuit coupled to a third antenna element, wherein the third switching circuit is configured to direct a signal from the third antenna element to a first port of the third switching circuit or to a second port of the third switching circuit based on a setting of switches of the third switching circuit.

3. The switched-feed antenna system of claim 2, wherein the first switching circuit and the third switching circuit are in a same logical column such that the first port of the first switching circuit and the first port of the third switching circuit are connected and the second port of the first switching circuit and the second port of the third switching circuit are connected.

4. The switched-feed antenna system of claim 2, further comprising a fourth switching circuit coupled to a fourth antenna element, wherein the fourth switching circuit is configured to direct a signal from the fourth antenna element to a first port of the fourth switching circuit or to a second port of the fourth switching circuit based on a setting of switches of the fourth switching circuit.

5. The switched-feed antenna system of claim 4, wherein the second switching circuit and the fourth switching circuit are in a same logical column such that the first port of the second switching circuit and the first port of the fourth switching circuit are connected and the second port of the second switching circuit and the second port of the fourth switching circuit are connected.

6. The switched-feed antenna system of claim 4, wherein the first combiner is configured to combine the signals at the first port of the third switching circuit and the first port of the fourth switching circuit into the first combined signal at a different time than the first combiner is configured to combine the signals at the first port of the first switching circuit and the first port of the second switching circuit into the first combined signal.

7. The switched-feed antenna system of claim 4, wherein the second combiner is configured to combine signals at the second port of the third switching circuit and the second port of the fourth switching circuit into the second combined signal at a different time than the second combiner is configured to combine the signals at the second port of the first switching circuit and the second port of the second switching circuit into the second combined signal.

8. The switched-feed antenna system of claim 4, wherein each of the third switching circuit, and the fourth switching circuit is a T-switch circuit comprising three or more switches.

9. The switched-feed antenna system of claim 1, further comprising a first low-noise amplifier (LNA) between the first switching circuit and the first antenna element and a second LNA between the second switching circuit and the second antenna element or a first high-power amplifier (HPA) between the first switching circuit and the first antenna element and a second HPA between the second switching circuit and the second antenna element.

10. The switched-feed antenna system of claim 1, further comprising a third switching circuit coupled to the first antenna element and a fourth switching circuit coupled to the second antenna element, wherein:
the third switching circuit is configured to direct a signal from the first antenna element to a first port of the third switching circuit or to a second port of the third switching circuit based on a setting of switches of the third switching circuit; and
the fourth switching circuit is configured to direct a signal from the second antenna element to a first port of the fourth switching circuit or to a second port of the fourth switching circuit based on a setting of switches of the fourth switching circuit.

11. A method of operating a switched-feed antenna system, the method comprising:
controlling a first switching circuit coupled to a first antenna element, wherein the first switching circuit is a T-switch circuit including at least three switches and is configured to direct a signal from the first antenna element to a first port of the first switching circuit or to a second port of the first switching circuit based on controlling a setting of the at least three switches of the first switching circuit;
controlling a second switching circuit to the second antenna element, wherein the second switching circuit is a T-switch circuit including at least three switches and is configured to direct a signal from the second antenna element to a first port of the second switching circuit or to a second port of the second switching circuit based on controlling a setting of the at least three switches of the second switching circuit, wherein
the first switching circuit and the second switching circuit are in separate logical columns such that the first port of the first switching circuit and the first port of the second switching circuit in the separate logical columns are not connected and the second port of the first switching circuit and the second port of the second switching circuit in the separate logical columns are not connected;
controlling a first combiner to combine the signals at the first port of the first switching circuit and the first port of the second switching circuit into a first combined signal; and, wherein the first port of the first switching circuit and the first port of the second switching circuit are separately coupled to the first combiner; and
controlling a second combiner to combine the signals at the second port of the first switching circuit and the second port of the second switching circuit into a second combined signal, wherein the second port of the first switching circuit and the second port of the second switching circuit are separately coupled to the second combiner.

12. The method of claim 11, further comprising controlling a third switching circuit coupled to a third antenna element in a same logical column as the first antenna element, wherein the third switching circuit is configured to direct a signal from the third antenna element to a first port of the third switching circuit or to a second port of the third switching circuit based on controlling switches of the third switching circuit.

13. The method of claim 12, wherein the controlling the first switching circuit and the third switching circuit includes controlling the switches of the first switching circuit and the switches of the third switching circuit such that only the first switching circuit directs signals to the first port and the second port of the first switching circuit or only the third switching circuit directs signals to the first port and the second port of the third switching circuit at a same time.

14. The method of claim 12, further comprising controlling a fourth switching circuit coupled to a fourth antenna element, wherein the fourth switching circuit is configured to direct a signal from the fourth antenna element to a first port of the fourth switching circuit or to a second port of the fourth switching circuit based on controlling switches of the fourth switching circuit.

15. The method of claim 14, wherein the controlling the second switching circuit and the fourth switching circuit includes controlling the switches of the second switching circuit and the switches of the fourth switching circuit such that only the second switching circuit directs signals to the first port and the second port of the second switching circuit or only the fourth switching circuit directs signals to the first port and the second port of the fourth switching circuit at a same time.

16. The method of claim 14, further comprising controlling the first combiner to combine the signals at the first port of the third switching circuit and the first port of the fourth switching circuit into the first combined signal at a different time than the signals at the first port of the first switching circuit and the first port of the second switching circuit.

17. The method of claim 14, further comprising controlling the second combiner to combine the signals at the second port of the third switching circuit and the second port of the fourth switching circuit into the second combined signal at a different time than the signals at the second port of the first switching circuit and the second port of the second switching circuit.

18. The method of claim 14, wherein the controlling each of the third switching circuit, and the fourth switching circuit includes controlling a T-switch circuit comprising three or more switches.

19. The method of claim 11, further comprising controlling a third switching circuit coupled to the first antenna element and controlling a fourth switching circuit coupled to the second antenna element, wherein
the third switching circuit is configured to direct a signal from the first antenna element to a first port of the third switching circuit or to a second port of the third switching circuit based on controlling switches of the third switching circuit; and
the fourth switching circuit is configured to direct a signal from the second antenna element to a first port of the fourth switching circuit or to a second port of the fourth switching circuit based on controlling switches of the fourth switching circuit.

20. The method of claim 19, further comprising controlling the first combiner to combine the signals at the first port of the third switching circuit and the first port of the fourth switching circuit into the first combined signal at a different time than the signals at the first port of the first switching circuit and the first port of the second switching circuit and controlling the second combiner to combine the signals at the second port of the third switching circuit and the second port of the fourth switching circuit into the second combined signal at a different time than the signals at the second port of the first switching circuit and the second port of the second switching circuit.

\* \* \* \* \*